(12) United States Patent
Fithian et al.

(10) Patent No.: US 7,257,462 B2
(45) Date of Patent: Aug. 14, 2007

(54) SYSTEM, METHOD, AND COMPUTER PROGRAM PRODUCT FOR LOCALIZED CAVITY MILLING DESIGN

(75) Inventors: Timothy Ray Fithian, Birmingham, MI (US); Zhenqun Li, Troy, MI (US)

(73) Assignee: UGS Corp., Plano, TX (US)

( * ) Notice: Subject to any disclaimer, the term of this patent is extended or adjusted under 35 U.S.C. 154(b) by 0 days.

(21) Appl. No.: 11/223,760

(22) Filed: Sep. 9, 2005

(65) Prior Publication Data

US 2006/0064198 A1    Mar. 23, 2006

Related U.S. Application Data

(60) Provisional application No. 60/609,777, filed on Sep. 14, 2004.

(51) Int. Cl.
*G06F 19/00* (2006.01)
(52) U.S. Cl. .......................... 700/182; 700/98
(58) Field of Classification Search ............. 700/182, 700/184, 187, 190, 191, 98, 86; 345/420, 345/419, 682; 715/757
See application file for complete search history.

(56) References Cited

U.S. PATENT DOCUMENTS

| | | | | |
|---|---|---|---|---|
| 6,073,058 A | * | 6/2000 | Cossen et al. | 700/184 |
| 6,144,896 A | * | 11/2000 | Kask et al. | 700/182 |
| 6,219,586 B1 | * | 4/2001 | Sakai | 700/182 |
| 2003/0179220 A1 | | 9/2003 | Dietrich, Jr. et al. | |
| 2003/0234781 A1 | | 12/2003 | Laidlaw et al. | |
| 2004/0003370 A1 | | 1/2004 | Schenk et al. | |
| 2004/0012596 A1 | | 1/2004 | Allen et al. | |
| 2004/0012597 A1 | | 1/2004 | Zatz et al. | |

OTHER PUBLICATIONS

Kekoa Proudfoot et al., "A Real-Time Procedural Shading System for Programmable Graphics Hardware", Computer Graphics Proceedings, Annual Conference Series, 2001, pp. 159-170.

* cited by examiner

*Primary Examiner*—Kidest Bahta

(57) ABSTRACT

A system, method, and computer program comprising loading a part definition; receiving a user selection of a local area of a part to be cut, the part corresponding to the part definition; creating a cut area max/min box according to the user selection; preparing a tracing according to the max/min box; identifying cut area containment shapes; setting trim shapes according to the cut area containment shape; creating cut-regions according to the trim, blank, part and check shapes; and creating a tool path program to cut the part, and appropriate means and computer-readable instructions.

24 Claims, 7 Drawing Sheets

SYSTEM, METHOD, AND COMPUTER PROGRAM PRODUCT FOR LOCALIZED CAVITY MILLING DESIGN

CROSS-REFERENCE TO OTHER APPLICATION

This application claims priority from U.S. Provisional Patent Application 60/609,777, filed Sep. 14, 2004, which is hereby incorporated by reference.

TECHNICAL FIELD OF THE INVENTION

The present invention is directed, in general, to computer-aided design and manufacturing (CAD/CAM) systems.

BACKGROUND OF THE INVENTION

In a typical machining context, the actual machining process and machine operator generally concentrate on one specific area of a part while it is being milled or otherwise machined. In CAD systems, however, most operations are directed to at least an entire part. Typical CAD/CAM systems do not support the "divide-and-conquer" machining strategy followed by many machinists, especially for high speed machining.

Machining a very small feature in a large part takes as much time as machining the large part itself. For this reason, there is a need in the art for a system, process and computer program product that enables CAD design and analysis of machine processes more precise machining.

SUMMARY OF THE INVENTION

According to one embodiment of the present invention, there is provided a method, and a related data processing system and computer program product, comprising loading a part definition; receiving a user selection of a local area of a part to be cut, the part corresponding to the part definition; creating a cut area max/min box according to the user selection; preparing a tracing according to the max/min box; identifying cut area containment shapes; setting trim shapes according to the cut area containment shape to limit the cutting regions; creating cutting regions according to the trim, blank, part, & check shapes; and creating a tool path program to cut the desired subset of the blank material up to the part.

The foregoing has outlined rather broadly the features and technical advantages of the present invention so that those skilled in the art may better understand the detailed description of the invention that follows. Additional features and advantages of the invention will be described hereinafter that form the subject of the claims of the invention. Those skilled in the art will appreciate that they may readily use the conception and the specific embodiment disclosed as a basis for modifying or designing other structures for carrying out the same purposes of the present invention. Those skilled in the art will also realize that such equivalent constructions do not depart from the spirit and scope of the invention in its broadest form.

Before undertaking the DETAILED DESCRIPTION OF THE INVENTION below, it may be advantageous to set forth definitions of certain words or phrases used throughout this patent document: the terms "include" and "comprise," as well as derivatives thereof, mean inclusion without limitation; the term "or" is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, whether such a device is implemented in hardware, firmware, software or some combination of at least two of the same. It should be noted that the functionality associated with any particular controller may be centralized or distributed, whether locally or remotely. Definitions for certain words and phrases are provided throughout this patent document, and those of ordinary skill in the art will understand that such definitions apply in many, if not most, instances to prior as well as future uses of such defined words and phrases.

BRIEF DESCRIPTION OF THE DRAWINGS

For a more complete understanding of the present invention, and the advantages thereof, reference is now made to the following descriptions taken in conjunction with the accompanying drawings, wherein like numbers designate like objects, and in which.

DETAILED DESCRIPTION OF THE INVENTION

FIGS. 1 through 14, discussed below, and the various embodiments used to describe the principles of the present invention in this patent document are by way of illustration only and should not be construed in any way to limit the scope of the invention. Those skilled in the art will understand that the principles of the present invention may be implemented in any suitably arranged device. The numerous innovative teachings of the present application will be described with particular reference to the presently preferred embodiment.

Various embodiments provide an individual or a group of surface areas as a context for roughing. This enables easy and predictable localized cavity milling and other machining. One advantage of some disclosed embodiments is that the user can easily define the feature or area that he wants to concentrate on. In these embodiments, the system only activates roughing in the specific area defined by the use. This provides benefits including allowing the user to only concentrate his roughing efforts one area at a time. This approach makes the process very straight forward and effective. Another benefit is that processing time decreases because the user is only generating a tool path for the individual feature. Various embodiments can be advantageous both for high speed machining and for conventional roughing.

Various embodiments enable users to specify individual features for localized machining rather than entire parts. It allows the user to machine only the specified features and treat non-contiguous set of surfaces as separate areas for machining within a single operation.

Some embodiments provide alternate methods of defining implied local blanks. This is particularly useful for open features. In a closed cavity, the area to be machined at each level is well defined by the boundary of the cavity. In open cavities, users need to provide information about where the machining area stops.

Following are several useful forms of implied local blank definitions: cut-area edge containment plus 2d extension distance, reference tool, Bounding Box, and User defined boundary.

The tool holder may further reduce the cut-region to be machined.

Following is a description of the system context of various embodiments, then a further description of the operation of various embodiments of the present invention.

Figure 1:
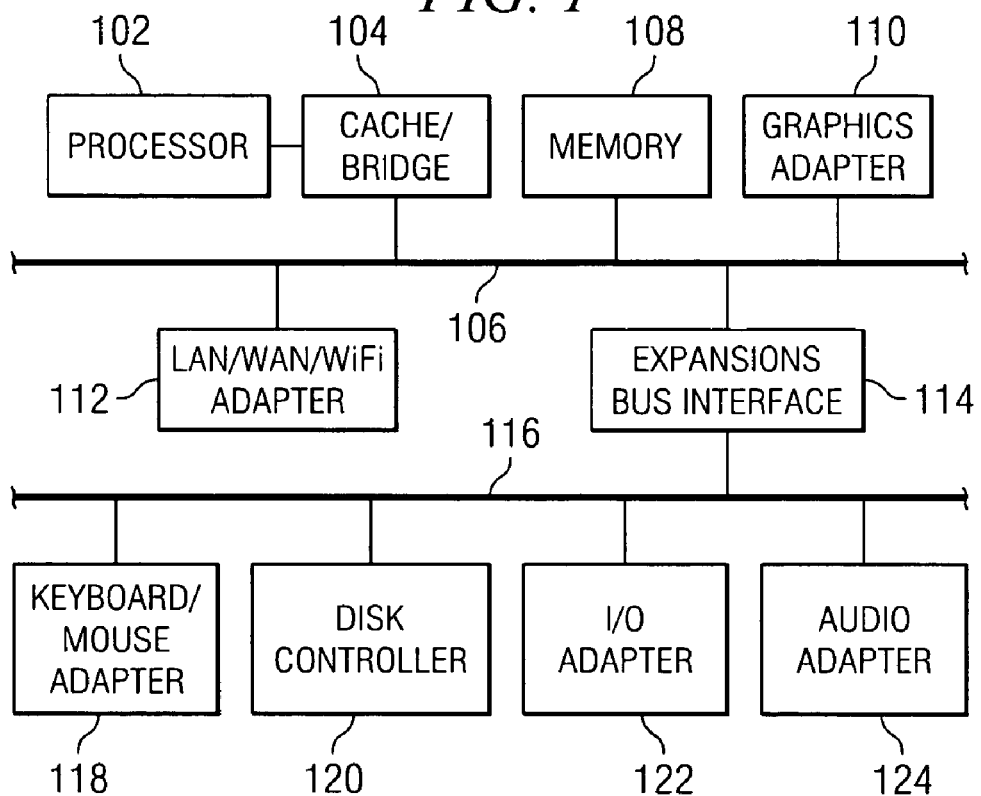
FIG. 1 depicts a block diagram of a data processing system in which a preferred embodiment can be implemented.

FIG. 1 depicts a block diagram of a data processing system in which a preferred embodiment can be implemented. The data processing system depicted includes a processor 102 connected to a level two cache/bridge 104, which is connected in turn to a local system bus 106. Local system bus 106 may be, for example, a peripheral component interconnect (PCI) architecture bus. Also connected to local system bus in the depicted example are a main memory 108 and a graphics adapter 110.

Other peripherals, such as local area network (LAN)/Wide Area Network/Wireless (e.g. WiFi) adapter 112, may also be connected to local system bus 106. Expansion bus interface 114 connects local system bus 106 to input/output (I/O) bus 116. I/O bus 116 is connected to keyboard/mouse adapter 118, disk controller 120, and I/O adapter 122.

Also connected to I/O bus 116 in the example shown is audio adapter 124, to which speakers (not shown) may be connected for playing sounds. Keyboard/mouse adapter 118 provides a connection for a pointing device (not shown), such as a mouse, trackball, trackpointer, etc.

Those of ordinary skill in the art will appreciate that the hardware depicted in FIG. 1 may vary for particular. For example, other peripheral devices, such as an optical disk drive and the like, also may be used in addition or in place of the hardware depicted. The depicted example is provided for the purpose of explanation only and is not meant to imply architectural limitations with respect to the present invention.

A data processing system in accordance with a preferred embodiment of the present invention includes an operating system employing a graphical user interface. The operating system permits multiple display windows to be presented in the graphical user interface simultaneously, with each display window providing an interface to a different application or to a different instance of the same application. A cursor in the graphical user interface may be manipulated by a user through the pointing device. The position of the cursor may be changed and/or an event, such as clicking a mouse button, generated to actuate a desired response.

One of various commercial operating systems, such as a version of Microsoft Windows™, a product of Microsoft Corporation located in Redmond, Wash. may be employed if suitably modified. The operating system is modified or created in accordance with the present invention as described.

Figure 2:
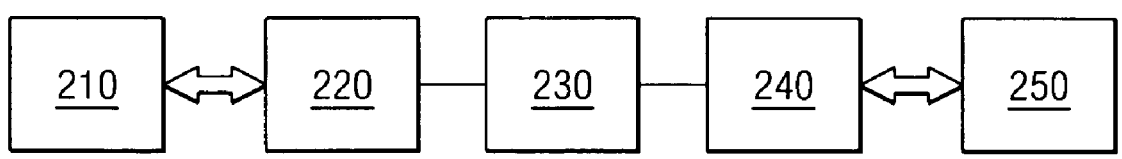
FIG. 2 depicts a simplified block diagram of a numerically-controlled machine, providing a system context for some embodiments of the present invention.

FIG. 2 depicts a simplified block diagram of a numerically-controlled machine, which can be a milling machine. Here, data processing system 210, which can be structured as the data processing system depicted in FIG. 1, is connected to control machine 220. Machine 220 operates tool 240, fastened by holder 230. Tool 240 cuts work-piece 250. This simplified machine configuration is well known to those of skill in the art, and provides a system context for various embodiments of the invention described herein.

Various embodiments enable a "Cut Area" function enabling a user to localize the regions on the part to be machined. The system can then contain and extend these regions using rules to machine the volume between the cut area and the blank geometry.

When generating a cavity mill operation with cut area geometry defined, in order to improve the performance, the system creates a 2D Max/Min box based on the Cut Area geometry, and limits the scope of the machine operation to only the box area of the part. This box is initially defined as the Max/Min box of the cut area, and then enlarged by an offset distance to account for maximum stock, maximum tolerance, maximum tool radius, horizontal safe clearance, system tolerance, and cut area extension distance parameters. If there are any user-defined trim boundaries, the box areas outside the boundaries will be trimmed out.

As the system prepares tracing, the Max/Min box will be used to limit the scope to create traces only within the box area. At the end of tracing, both the 3D and 2D containments for each of the contiguous cut area faces will be created and stored.

The terms "containment" or "cut-area containment," as used herein, generally refer to an intersection-free 3D loop that contains the tool contacts of the given cut-area faces. In simpler terms, a containment can be generally visualized as the tool trace around the exterior edges of the cut-area with all intersection loops removed.

In order to only cut a cut area with its surround areas, the system then identifies and creates a cut area containment shape for each of the contiguous cut area faces at each of the cut level based on the original 3D and 2D containments, part cut shapes, cut area extension distance, and uses this shape as the trim to be combined with all other existing trim shapes so as to contain the tool path within it. If the cut area extension distance is zero, the original 2D containment will be used directly as the cut area containment shape, while if the distance is larger than zero the original 2D containment will be modified (or extended to its offset containment) to form the cut area containment shape.

Using the disclosed techniques, the performance and memory that is required to machine the given cut areas when they are small relative to the overall size of the part and when high speed machining type tolerances are used for the operation. To improve the performance (and reduce the memory), the system preferably limits the scope of the operation accuracy to only those areas that are going to be cut by the current operation. Areas that are not going to be cut are not tolerance-critical and only need to be collision free during the non-cut move generation.

The areas on the part that are classified as "Critical" and need the operation tolerance accuracy are defined using the following order:

1. Determine the 2D Max/Min box of the Cut Area. If no Cut Area is defined, then the entire part is assumed to be the cut area.

2. Reduce the Cut Area by any trim outside boundaries. Again, the system does this using the 2D Max/Min box of these boundaries.

3. Increase the Critical Area 2D Box by the (maximum stock+maximum tolerance+maximum tool radius+horizontal safe clearance+systol). This is done to guarantee that any part within the critical area that is potentially reachable by the tool is processed at the appropriate tolerance. The horizontal safe clearance is added to ensure that the safe regions (used for non-cutting motions) around the part are accurate up to this offset distance.

Figure 3A:
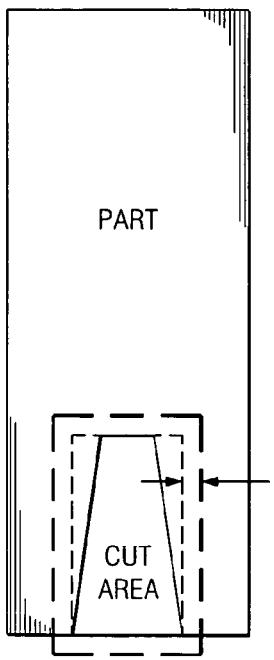
FIGS. 3A and 3B illustrate an exemplary figure in accordance with a disclosed embodiment of the present invention.
Figure 3B:
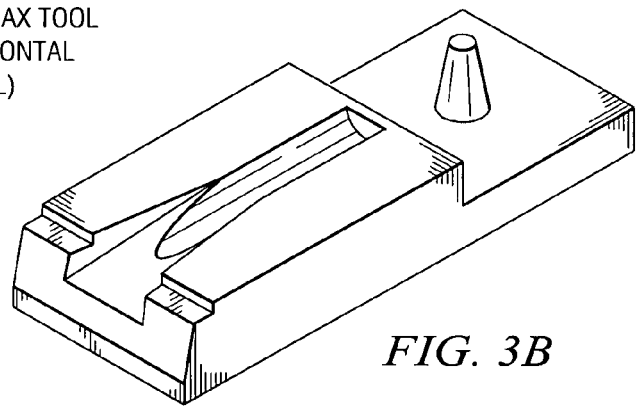

FIGS. 3A and 3B illustrate how the critical area boxes contain the Cut Area plus the offset distance in an exemplary figure, used below to illustrate a disclosed process. Multiple regions can be merged together to avoid recomputation of overlaps.

In tolerant cavity milling, the system traces the tool over the part geometry, a process that can also be used to create toolpath programs, in both the x & y directions, producing a 2-dimensional grid. This 2D grid is then sliced in planes to compute contour shapes of the traces at the given cut levels. These contour shapes represent the 3D tool offset of the part and as long as tool motions do not violate these regions, the part will not be gouged. With this information, cavity milling uses the shapes to form the regions that will be cut and also to check for potential collisions during the non-cutting move calculations.

The majority of the time and memory required to calculate the tool offset shapes is spent within the calculation of the 3D tool traces within the 2D grid. To guarantee machining tolerance and that no gouge occurs within the sliced contours, a formula is used to calculate a tight fixed resolution of the 2D grid.

However, some embodiments limit the scope of the tolerance to only the critical areas, so the extra time & memory used for tracing the non-critical areas is not needed. In these embodiments, the scope of the traces is limited to only the critical areas of the part, using the critical area's max-min box.

Because the entire part geometry will no longer be traced, it is possible that the part shape definitions could change from their actual types. For example, a cavity shape could end up being a core shape or vise-versa.

One aspect of various embodiment is that the z-level slicing (region building) assumes that the intersections with the plane always start below in the current level (because it is outside of the part). If traces quit in the middle of the part because of the maxmin box, this is no-longer the case. To satisfy this assumption, after the system projects the points that fall on the maxmin box, the points will be marked as no-touch and their z-values set this way.

Alternate embodiments provide means to ensure that non-cutting motions outside of the maxmin box are gouge and collision free, by loading the current tool and making calls to check this tool against the part and blank for gouges.

"Cut Area Containment Shapes," as used herein, are the 2D shapes to contain the tool path for cut areas per level. Each cut area will have its own cut area containment shape. For a same cut area, the cut area containment shape may be different from level to level, and the cut area containment shape at a level will contain the shapes at the lower levels (to ensure that the lower levels are accessible by the tool).

At any level, the cut area containment shape is the maximum area the tool path for its associated cut area could go, the real cut region will be further contained by the part, check, blank and trim shapes.

Figure 4:
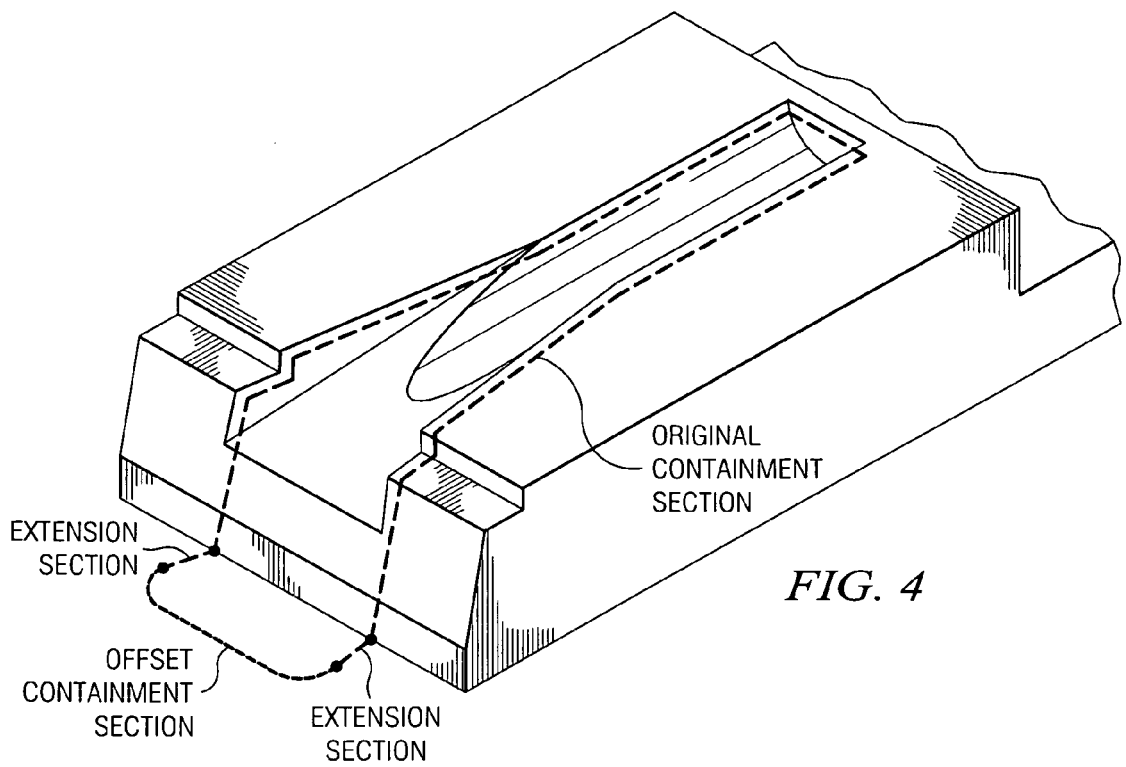
FIG. 4 depicts 3D cut area containment loops, in accordance with an embodiment of the present invention.

FIG. 4 depicts cut area containment sections, in accordance with an embodiment of the present invention. A cut area containment shape usually consists of original containment sections, extension sections and offset containment sections as shown in FIG. 4. Some containment shapes may be directly from the original containment and have no other sections, such as the containment shape for a closed cavity, while some may only have the offset containment, such as the containment shape for a boss.

Cut Area Containment Shapes (CACSs) here refer to the shapes identified and obtained from analyzing the original 3D and 2D containments, part cut shapes, and cut area extension distance. The 2D containment refers to the original 3D containment projected on a plane.

If the cut area extension distance is zero, the original 2D containments are directly used as the Cut Area Containment Shapes (CACSs). If the distance is larger than zero, the following steps will be used to identify the CACSs from the original 2D and 3D containments, and part cut shapes.

Step 1, creating the original 3D and 2D containments. Step 2, slicing the 3D containment. Step 3, associating part shapes to the 3D containment. Step 4, identifying extension locations. Step 5, extending cut area trace to offset containment. Step 6, identifying cut area containment shapes.

If there are multiple cut areas defined in one operation, the identified cut area containment shape for each of the cut areas will be unioned together at each level before combining with the other trim shapes.

The original 3D and 2D containments are created as described below. The 3D containment will be projected onto the tool plane to get its original 2D containment. The original 3D and 2D containments will be analyzed and used as the base for creating cut area containment shapes (CACSs). FIG. 4 depicts 3D cut area containment loops, in accordance with an embodiment of the present invention, for an exemplary cut area region.

Different cut area geometry features use different strategies to define the material volume to be machined. For example, if the cut area geometry forms a closed pocket, its 2D containment can be used directly as the cut area containment shape for each of the cut levels without doing cut area extension to its enlarged offset containment; if the cut area forms a boss, its enlarged offset containment by the cut area extension distance will be used as the cut area containment shape to cut the material around the boss by that distance. In order to know the cut area geometry types, that is, whether a cut area is from a closed pocket, open pocket, partially open pocket, or boss, we need to analyze the cut area geometry through its 3D containment and part traces.

Figure 5:
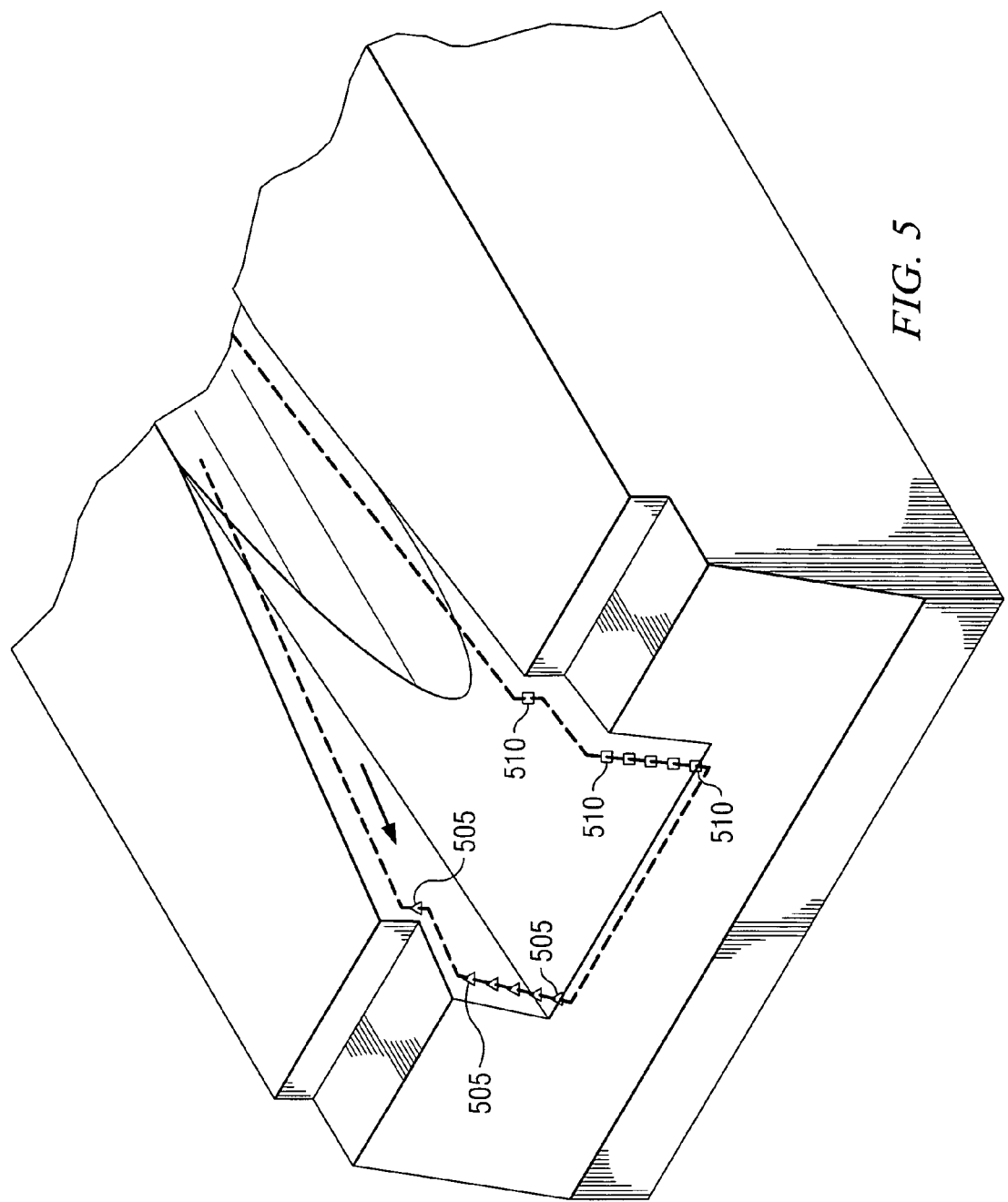
FIG. 5 depicts exemplary intersection points of 3D containment at each cutting level.

FIG. 5 depicts exemplary intersection points of 3D containment at each cutting level. In the process of analyzing the cut area geometry to find the geometry type and conditions, the system first uses the planes perpendicular to tool axis at the cut levels to slice the 3D containment to obtain the intersection points of the planes with the 3D containment. These intersection points are classified as either an enter point 505 (enter into open area) or an exit point 510 (exit from open area), as illustrated in FIG. 5. Walking along the containment direction, if the containment at an intersection point crosses a level from a high position to a low position, that point is an enter point 505; otherwise it is an exit point 510. The distance between a pair of enter point 505 and exit point 510 at a same level indicates how wide the open side of the open pocket is, and the enter and exit pairs at different levels indicate how deep the open side is and how the open side changes.

Figure 6:
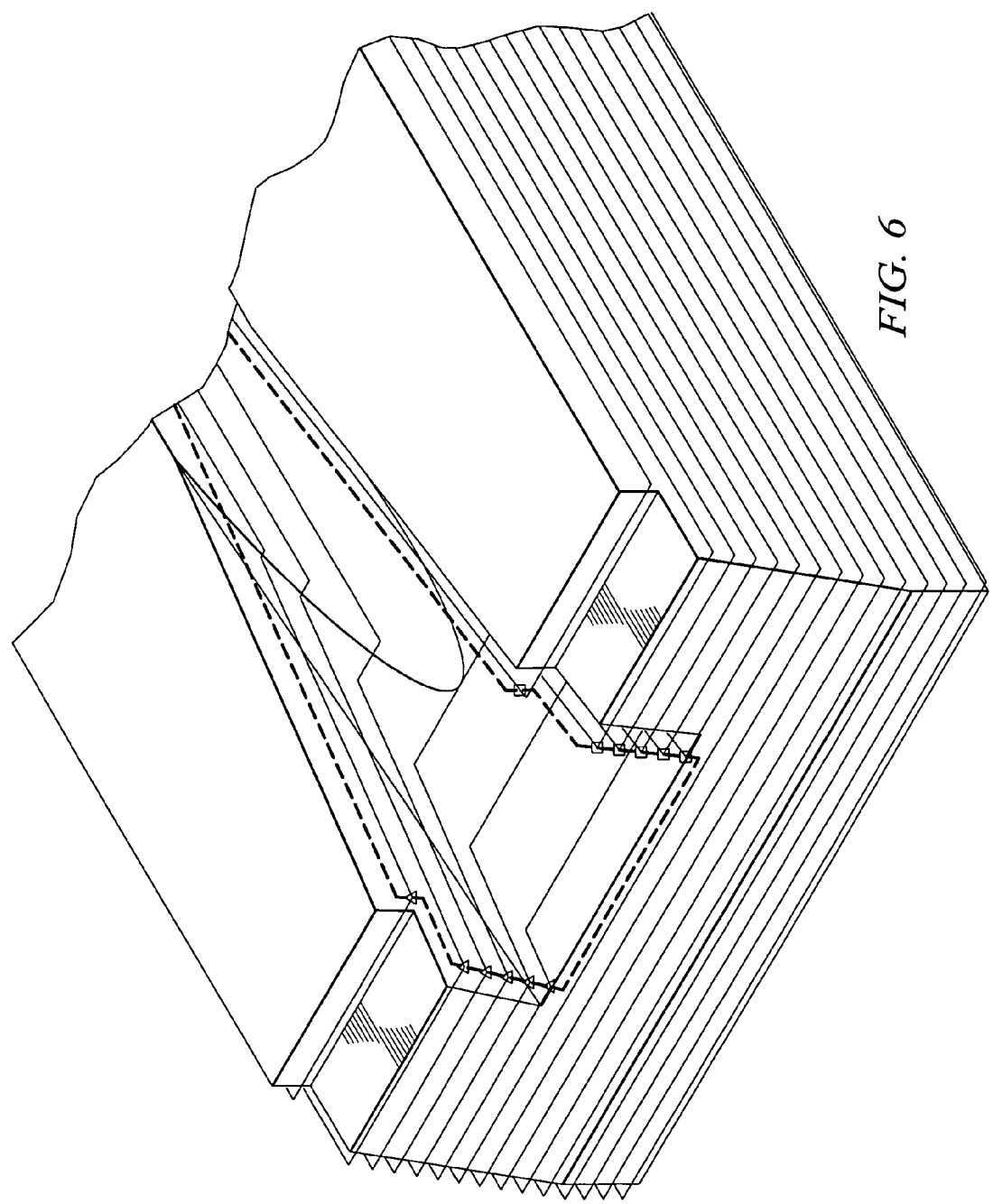
FIG. 6 depicts an exemplary figure illustrating a step of associating part cut level traces to 3D containment loops.

FIG. 6 depicts an exemplary figure illustrating a step of associating part cut level traces to 3D containment loops. In the next step, the system finds the part trace going through an intersection point, and associates this part trace to the intersection point. Using the intersection points with these associated part traces, the system can identify the exact cut area geometry conditions.

The purposes for associating part traces to 3D containment are to assist the system to find out where to extend the cut area traces to the offset containment, and to calculate a tangential extension vector at the intersection point from its associated part trace when the intersection point is identified as the point needs to be extended.

Once the intersection points and their associated part traces have been identified, the system can identify the cut area geometry types and determine whether a cut area needs to be extended or not. If cut area geometry needs to be extended, the system determines the locations to be extended.

If the 3D containment has no intersections at any levels, that means the 3D containment is from the exterior edges of horizontal faces. The cut area can be a closed pocket, a boss, or a set of horizontal faces. The system then finds the maximum part trace containment by the 3D containment. If the maximum contained part trace is from the level above the containment, the cut area is a boss and the original 2D containment needs to be offset to create the cut area containment shape; if the maximum trace is below the containment, the cut area is a closed pocket. If there is no part trace contained, the cut area is from flat faces. For closed pockets and flat faces cut areas, the original 2D containments will be used as the cut area containment shapes.

If the 3D containment has intersection points with cut level planes. By examining associated part traces at the intersection points, the system can determine whether the cut area is a boss, an open pocket, or a partially open pocket. If the material side of the associated part trace is pointing toward the inside of the containment, the cut area is a boss. Otherwise it is an open or a partial open pocket. For open or partially open pockets, the cut area traces need to be extended to the enlarged offset containment.

Figure 7:
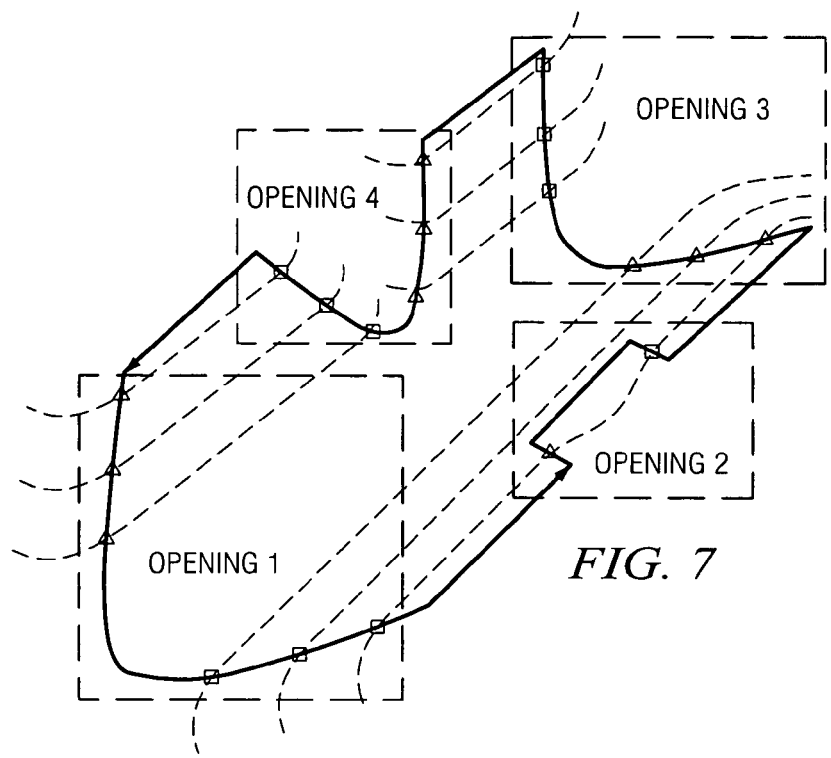
FIG. 7 illustrates how the multiple opening places within one cut area are identified and associated as enter/exit pairs in an exemplary figure.

FIG. 7 illustrates how the multiple opening places within one cut area are identified and associated as enter/exit pairs in an exemplary figure. By "walking" along the 3D containment, the intersection points on the containment should be arranged as the following order: Enter->enter->enter->exit->exit->exit->enter->exit->enter->enter->enter->exit->exit->exit->enter->enter->enter->exit->exit->exit.

A group of points from a start enter to an end exit belong to a same opening place. A true opening has a part trace that goes outside of the containment. Multiple openings are identified by determining all groups of intersection points. The total number of such groups is the number of opening places needing to be extended. FIG. 7 shows there are four opening places within this cut area.

Figure 8:
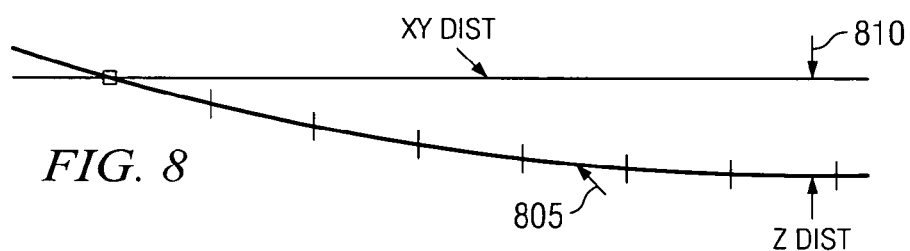
FIG. 8 depicts fake opening places within one cut area in an exemplary figure.

FIG. 8 depicts fake opening places within one cut area. As shown in FIGS. 6 and 7, a true opening will have part traces going across the containment to the outside of it. However, if one of the following conditions is found, this opening is a fake opening place and its intersection points will be reset as the non enter/exit points.

The part trace belong to an opening is inside the containment (theoretically impossible)

Or the depth of the containment within the opening section is too shallow (Z distance 810 is small, FIG. 8)

Or the part trace is along the containment within the opening section (XY distance 805 is small, FIG. 8)

Figure 9:
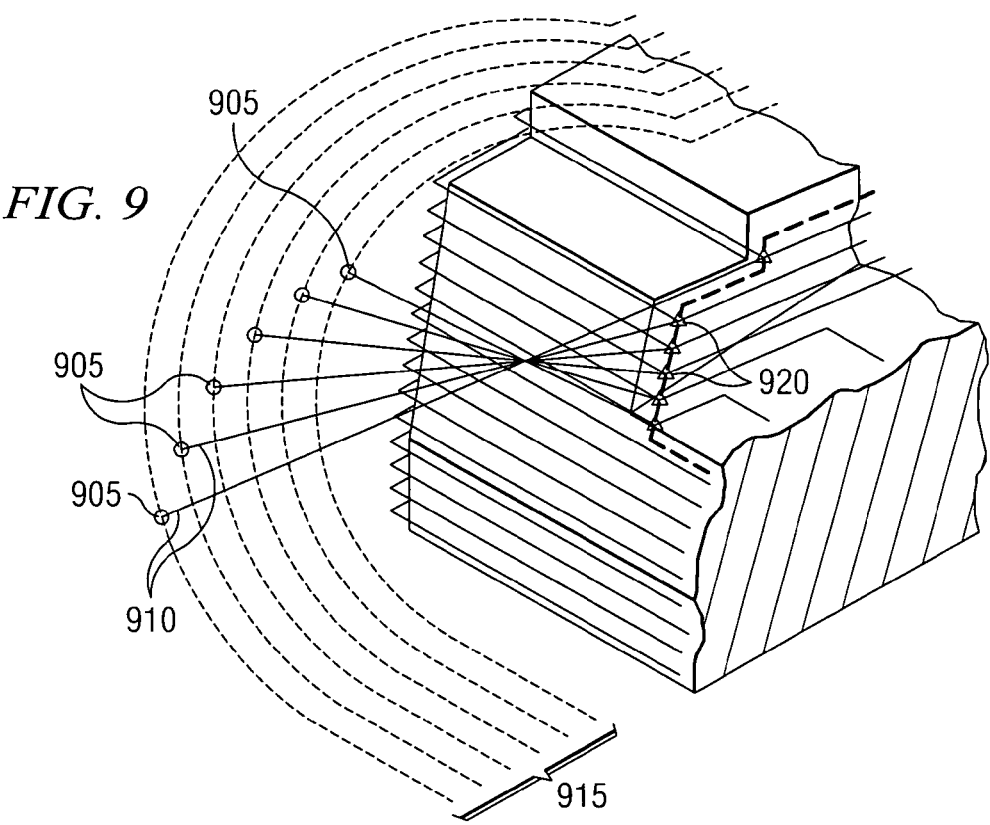
FIG. 9 illustrates extending cut area traces to offset containment, in accordance with an embodiment of the present invention.

FIG. 9 illustrates extending cut area traces to offset containment so that material to be removed in the lower levels is first removed in the upper levels (to make it accessible by the tool), in accordance with an embodiment of the present invention. For open and partially open pockets, the cut area traces end at the intersection points 920 of the 3D containment with the cut level planes. Tangential vectors at these intersection points 920 along the cut area traces will be computed. The original 2D containment at these intersection points 920 are extended to the enlarged offset containment along the tangential vector of the cut area trace, as depicted in FIG. 9. Also depicted are extension points 905, extension sections 910, and offset containment 915.

The following steps are used to do the extension.

Step 1, offset the original 2D containment to create the enlarged 2D offset containment. Step 2, compute the tangential vector at each intersection point along its cut area trace. Step 3, create an extension segment from the end of the cut area trace to the offset containment. Step 4, mark the extension points on the offset containment.

In Step 2 of computing the tangential vector at each intersection point along its cut area trace, the computed tangents may be unstable if the tangent is determined from only one segment, especially when the segment is a small segment. A weighted average tangent from several neighboring segments will be used to damp out any noise.

Figure 10:
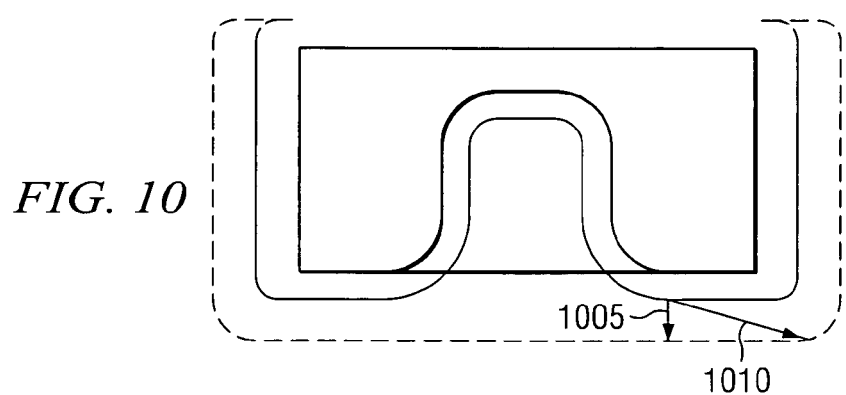
FIG. 10 illustrates tangential extension versus shortest distance extension, in accordance with an embodiment of the present invention.

FIG. 10 illustrates tangential extension versus shortest distance extension. In Step 3, if the tangential extension segment 1010 is too long compared to the shortest distance extension segment 1005 as shown in FIG. 10, the tangential extension segment 1010 will be replaced by the shortest distance extension segment 1005.

Figure 11:
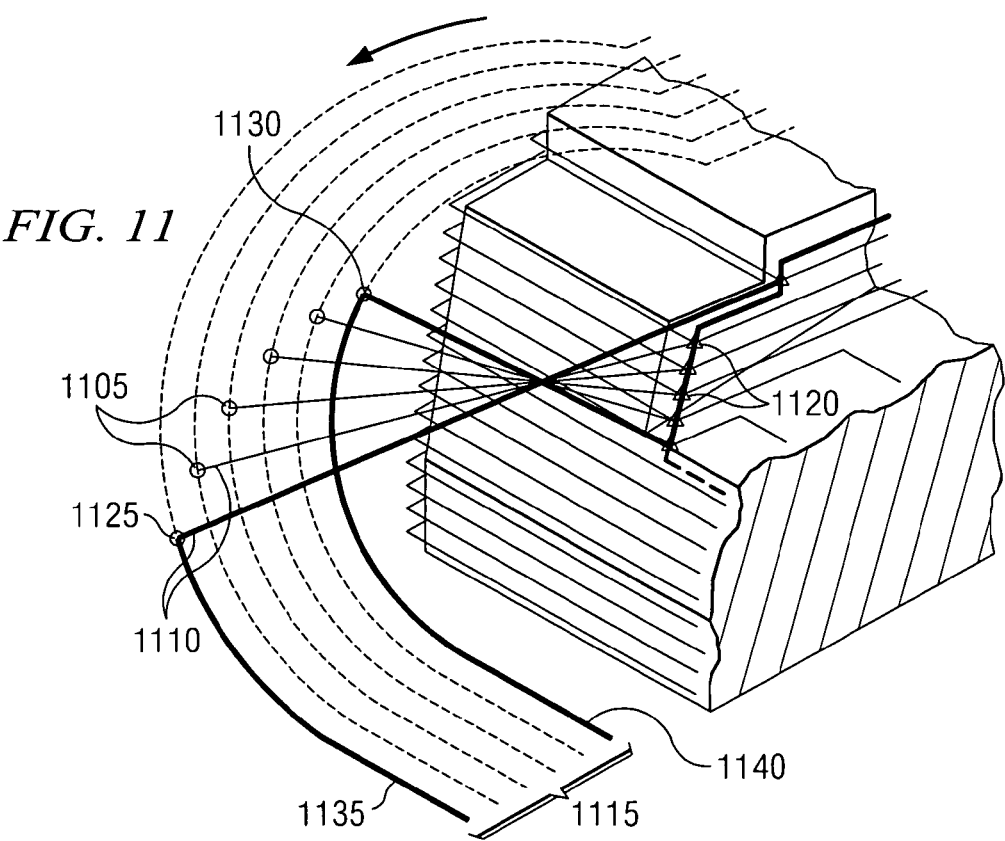
FIG. 11 illustrates identifying final cut area containment shape for an exemplary figure.

FIG. 11 illustrates identifying final cut area containment shape (modified to follow the outermost extension point) for an exemplary figure. After the extension sections 1110 have been identified, at each level, an initial cut area containment shape 1135 will appear by orderly collecting the original 2D containment sections, extension sections 1110 and offset containments 1115 as presented as described above. As the extensions are done at each level individually, the initial cut area containment shape 1135 at a level may be smaller than (cross with) the shape at a lower level, as illustrated by intersection points 1120 in FIG. 11. That is not acceptable, as the material at the level is not removed when accessing the material at the lower level. So interference checking is performed when turning the initial cut area containment shapes into the final cut area containment shapes 1140. If the initial cut area containment shape 1135 at a level is not smaller than any initial cut area containment shapes below, this initial shape becomes the final cut area containment shape for that level; otherwise the initial cut area containment at a lower level with the outmost extension points becomes the final cut area containment shape for the current level. Also depicted are extension points 1105, extension sections 1110, and offset containment 1115.

Rule for cut area containment shapes: For cut area containment shapes from a same cut area, the cut area containment shape at a level will never be smaller than any cut area containment shapes below.

Steps for finding final cut area containment shapes for a level: Step 1, locate the extension points on the offset containment for the level. Step 2, do interference checking by looking the extension points order. Walking along the offset containment, find all the extension points in front of the current intersection point from the levels below the current level. Step 3, if there is no extension point found in step 2, the initial cut area containment shape of the current level will become the final cut area containment shape. Step 4, if there are extension points found in step 2, this means the current initial cut area containment shape will cross the lower levels. The initial cut area containment shape with the outmost extension point among those points found in step 2 will become the final cut area containment shape.

Figure 12:
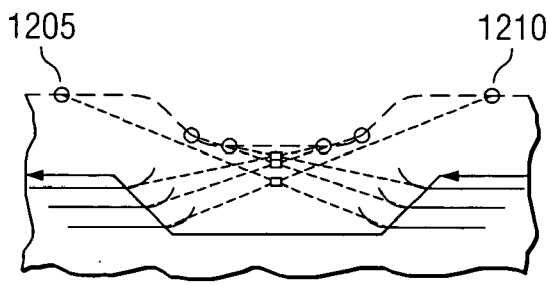
FIG. 12 depicts extension segments intersecting before reaching offset containment in an exemplary figure.

FIG. 12 depicts extension segments intersecting before reaching offset containment in an exemplary figure, and therefore the intersection points are used. When forming an initial cut area containment shape at each level, it is possible that the enter extension segments 1205 and exit extension segments 1210 at the same level intersect to each other before reaching the offset containment. In this case the initial cut area containment shape will not include the offset containment section and the extension portions beyond the intersection point as depicted in FIG. 12.

Figure 13:
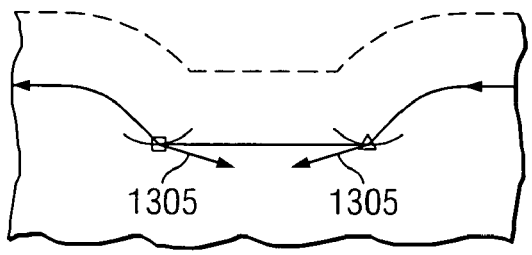
FIG. 13 illustrates using original containment when extension goes inside of containment.

FIG. 13 illustrates using original containment when extension goes inside of containment and therefore the containment shape is followed. If the extension segments go inside of the containment at a level, as at 1305, the original containment will be used as the initial cut area containment shape for that level, as depicted in FIG. 13.

For cases where extension sections cannot be definitely identified for an opening place because of bad tangential vectors or noise, and inconsistent geometry information, the original containment is used to contain the tool path for that portion of the cut area, or the initial cut area containment shape of the last level is used as the final cut area containment shapes for all levels of that opening place.

Figure 14:
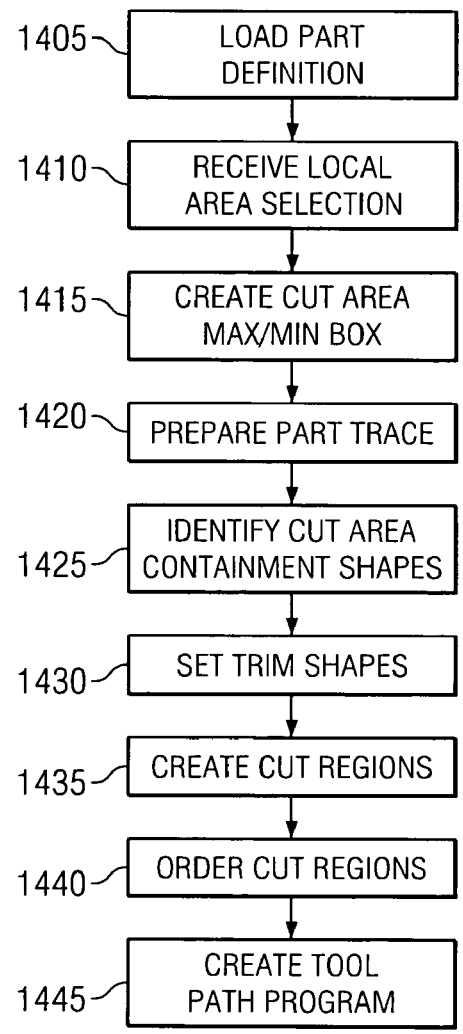
FIG. 14 depicts a flowchart of a process in accordance with a disclosed embodiment.

FIG. 14 depicts a flowchart of a simplified process in accordance with a preferred embodiment and as described in detail above, as preferably performed by a data processing system and embodied in machine-readable instructions for a computer program product.

First, a part definition is loaded (step 1405), that preferably defines a part to be designed and manufactured, and can include tool path programs for the part. "Loaded" as used in this context can include loading the part definition from storage, or receiving it from a user entry or other means known to those of skill in the art.

Next, receive a user selection of a local area of the part to be cut (step 1410), corresponding to the part definition.

Next, create a cut area max/min box (step 1415) according to the user selection.

Next, prepare a part trace according to the max/min box (step 1420).

Next, identify cut area containment shapes (step 1425). This step includes several sub-steps, as described above, including building 3-dimensional cut area containment loops (or shapes), and building the 2-dimensional cut-area containment shapes per cut-level.

Next, set trim shapes according to the cut area containment shapes (step 1430). Here, the system will represent the 2d cut-area shapes as trim shapes to limit the cutting region.

Next, create cut-regions according to the trim, part, blank, and check shapes (step 1435). Note that blank and check traces are calculated similar to the part, as described above.

Next, order the cut regions by depth or by level (1440).

Finally, create a tool path program to cut the subset of the blank material contained by the cut-area of the part (step 1445).

Those skilled in the art will recognize that, for simplicity and clarity, the full structure and operation of all data processing systems suitable for use with the present invention is not being depicted or described herein. Instead, only so much of a data processing system as is unique to the present invention or necessary for an understanding of the present invention is depicted and described. The remainder of the construction and operation of the data processing system may conform to any of the various current implementations and practices known in the art. Those of skill in the art will understand which elements of the data processing system act as appropriate means for performing various functions.

It is important to note that while the present invention has been described in the context of a fully functional system, those skilled in the art will appreciate that at least portions of the mechanism of the present invention are capable of being distributed in the form of computer-executable instructions contained within a machine readable medium in any of a variety of forms, and that the present invention applies equally regardless of the particular type of instruction or signal bearing medium utilized to actually carry out the distribution. Examples of machine readable mediums include: nonvolatile, hard-coded type mediums such as read only memories (ROMs) or erasable, electrically programmable read only memories (EEPROMs), user-recordable type mediums such as floppy disks, hard disk drives and compact disk read only memories (CD-ROMs) or digital versatile disks (DVDs), and transmission type mediums such as digital and analog communication links.

Although an exemplary embodiment of the present invention has been described in detail, those skilled in the art will understand that various changes, substitutions, variations, and improvements of the invention disclosed herein may be made without departing from the spirit and scope of the invention in its broadest form.

None of the description in the present application should be read as implying that any particular element, step, or function is an essential element which must be included in the claim scope: THE SCOPE OF PATENTED SUBJECT MATTER IS DEFINED ONLY BY THE ALLOWED CLAIMS. Moreover, none of these claims are intended to invoke paragraph six of 35 USC §112 unless the exact words "means for" are followed by a participle.

What is claimed is:

1. A method, comprising:
   loading a part definition;
   receiving a user selection of a local area of a part to be cut, the part corresponding to the part definition;
   creating a cut area max/min box according to the user selection;
   preparing a tracing according to the max/min box;
   identifying cut area containment shapes;
   setting trim shapes according to the cut area containment shape;
   creating cut-regions according to the trim shapes; and
   creating a tool path program to cut the part;

storing the tool path program in a data process memory;
storing the tool path program in the data process memory.

2. The method of claim 1, wherein the cut area containment shape is the maximum area the tool path can address for an associated cut area on a specified cut level of the part.

3. The method of claim 1, wherein the cut area max/min box defines a two-dimensional area.

4. The method of claim 1, wherein cut area containment shape defines a three-dimensional area.

5. The method of claim 1, wherein cut area containment shape comprises multiple layers.

6. The method of claim 1, further comprising performing collision checking according to the regions.

7. The method of claim 1, wherein the cut regions are created also according to part, check, and blank shapes.

8. The method of claim 1, wherein the cut area containment shape at a first level contains the cut area containment shape at a lower level.

9. A data processing system having at least a processor and accessible memory, comprising:
    means for loading a part definition;
    means for receiving a user selection of a local area of a part to be cut, the part corresponding to the part definition;
    means for creating a cut area max/min box according to the user selection;
    means for preparing a tracing according to the max/min box;
    means for identifying cut area containment shapes;
    means for setting trim shapes according to the cut area containment shape;
    means for creating cut-regions according to the trim shapes; and
    means for creating a tool path program to cut the part.

10. The data processing system of claim 9, wherein the cut area containment shape is the maximum area the tool path can address for an associated cut area on a specified cut level of the part.

11. The data processing system of claim 9, wherein the cut area max/min box defines a two-dimensional area.

12. The data processing system of claim 9, wherein cut area containment shape defines a three-dimensional area.

13. The data processing system of claim 9, wherein cut area containment shape comprises multiple layers.

14. The data processing system of claim 9, further comprising means for performing collision checking according to the regions.

15. The data processing system of claim 9, wherein the cut regions are created also according to part, check, and blank shapes.

16. The data processing system of claim 9, wherein the cut area containment shape at a first level contains the cut area containment shape at a lower level.

17. A computer program product tangibly embodied in a machine-readable medium, comprising:
    computer-executable instructions for loading a part definition;
    computer-executable instructions for receiving a user selection of a local area of a part to be cut, the part corresponding to the part definition;
    computer-executable instructions for creating a cut area max/min box according to the user selection;
    computer-executable instructions for preparing a tracing according to the max/min box;
    computer-executable instructions for identifying cut area containment shapes;
    computer-executable instructions for setting trim shapes according to the cut area containment shape;
    computer-executable instructions for creating cut-regions according to the trim shapes; and
    computer-executable instructions for creating a tool path program to cut the part;
    computer-instructions for storing the tool path program in the machine-readable medium.

18. The computer program product of claim 17, wherein the cut area containment shape is the maximum area the tool path can address for an associated cut area on a specified cut level of the part.

19. The computer program product of claim 17, wherein the cut area max/min box defines a two-dimensional area.

20. The computer program product of claim 17, wherein cut area containment shape defines a three-dimensional area.

21. The computer program product of claim 17, wherein cut area containment shape comprises multiple layers.

22. The computer program product of claim 17, further comprising computer-executable instructions for performing collision checking according to the regions.

23. The computer program product of claim 17, wherein the cut regions are created also according to part, check, and blank shapes.

24. The computer program product of claim 17, wherein the cut area containment shape at a first level contains the cut area containment shape at a lower level.

* * * * *